US009161235B2

(12) United States Patent
Jo et al.

(10) Patent No.: US 9,161,235 B2
(45) Date of Patent: Oct. 13, 2015

(54) FREQUENCY BAND DETERMINATION METHOD IN COEXISTENCE SCHEME

(75) Inventors: Junho Jo, Anyang-si (KR); Suhwook Kim, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/115,071

(22) PCT Filed: Jul. 29, 2011

(86) PCT No.: PCT/KR2011/005603
§ 371 (c)(1),
(2), (4) Date: Oct. 31, 2013

(87) PCT Pub. No.: WO2012/153892
PCT Pub. Date: Nov. 15, 2012

(65) Prior Publication Data
US 2014/0066086 A1   Mar. 6, 2014

Related U.S. Application Data

(60) Provisional application No. 61/485,106, filed on May 11, 2011, provisional application No. 61/485,126, filed on May 12, 2011.

(51) Int. Cl.
*H04W 16/14* (2009.01)
*H04L 27/00* (2006.01)
*H04W 72/04* (2009.01)
*H04W 48/14* (2009.01)

(52) U.S. Cl.
CPC ........... *H04W 16/14* (2013.01); *H04L 27/0006* (2013.01); *H04W 48/14* (2013.01); *H04W 72/0453* (2013.01)

(58) Field of Classification Search
None
See application file for complete search history.

(56) References Cited

U.S. PATENT DOCUMENTS

2009/0280748 A1*  11/2009  Shan et al. ................. 455/67.11
2010/0048234 A1*  2/2010   Singh .......................... 455/509
(Continued)

FOREIGN PATENT DOCUMENTS

KR   10-2009-0065405   6/2009
KR   10-2010-0019921   2/2010

OTHER PUBLICATIONS

PCT International Application No. PCT/KR2011/005603, Written Opinion of the International Searching Authority dated Mar. 27, 2012, 14 pages.

*Primary Examiner* — Hilina K Demeter
(74) *Attorney, Agent, or Firm* — Lee, Hong, Degerman, kang & Waimey

(57) ABSTRACT

According to one embodiment of the present invention, provided is a frequency band (FB) determination method of a wireless access device which provides an access point to enable one or more terminals to wirelessly access a network. The method may comprise the steps of receiving database-related information from database servers which have database related to unused FBs of a television broadcasting band (TVBB), determining a database server to be accessed among the database servers on the basis of the database-related information, requesting the determined database server and receiving information on available FBs, and determining FBs, among the received operating FBs, for the one or more terminals. The operating FBs are determined by the database server so that the wireless access device can coexist with a neighboring homogeneous or heterogeneous wireless access device without mutual interference within the TVBB.

8 Claims, 12 Drawing Sheets

(56) References Cited

U.S. PATENT DOCUMENTS

| | | | |
|---|---|---|---|
| 2010/0205628 A1* | 8/2010 | Davis et al. | 725/25 |
| 2011/0164580 A1* | 7/2011 | Keon | 370/329 |
| 2011/0299511 A1* | 12/2011 | Cook | 370/338 |
| 2013/0103684 A1* | 4/2013 | Yee et al. | 707/736 |

* cited by examiner

FREQUENCY BAND DETERMINATION METHOD IN COEXISTENCE SCHEME

CROSS-REFERENCE TO RELATED APPLICATIONS

This application is the National Stage filing under 35 U.S.C. 371 of International Application No. PCT/KR2011/005603, filed on Jul. 29, 2011, which claims the benefit of U.S. Provisional Application Ser. No. 61/485,106, filed on May 11, 2011, and 61/485,126, filed on May 12, 2011, the contents of which are all hereby incorporated by reference herein in their entirety.

TECHNICAL FIELD

The present invention relates to a coexistence scheme.

BACKGROUND ART

Conventionally, frequency arrangement for a new service or frequency arrangement for a new provider has been made under the control of the government.

In particular, if there are new providers, a new frequency may be allocated through auction or the existing frequency may be collected from the existing provider and then rearranged for another provider to distribute frequencies of limited resources.

However, with the recent spread of various wireless Internet based applications such as opened user equipment platform, application store, and mobile VoIP, the demand of radio data traffic has been increased rapidly. For this reason, frequency distribution under the control of the government was very inefficient, and it has been gradually difficult to ensure new frequency on a frequency distribution table.

In particular, with the rapid growth of broadcast and communication systems, a next generation communication system has been designed in the form of combination of various networks, the system has been gradually complicated, and the need of interworking has been gradually increased. Also, as the communication technology and services are developed, the usage frequency for frequency resources has been increased. As a specific spectrum band is fixedly reserved for excellent communication technology and service, the problem of the spectrum scarcity is becoming a big issue.

Recently, as a method for solving such a problem, a spectrum sharing scheme has received attention. The spectrum sharing scheme is based on the aspect that the spectrum scarcity may be solved through sharing although the spectrum is scarce on the spectrum distribution table as the current spectrum scarcity is based on the existing partitioning spectrum control scheme.

As the problem of the spectrum scarcity is recognized as the important issue all over the world, on the November of 2008, the US federal communications commission (FCC) has decided to apply the cognitive radio technology which is the spectrum sharing technology to TV idle spectrum (white space) to increase spectrum usage efficiency and facilitate the introduction of a new service and then has amended the related rule.

As this action has been gradually enlarged, the UK has allowed to use the cognitive radio (CR) based spectrum sharing technology at a band of TV broadcast bands, which is not used spatially, that is, white space band, in 2009, the EU is currently discussing the introduction of the CR based spectrum sharing technology, and the South Korea is also preparing for the policy for the spectrum sharing based on the white space band.

The cognitive radio technology refers to a system that allows a communication device to observe a communication status by itself, to determine and select an action mode for optimized communication, and to make a plane for the later determining procedure from the previous communication experience.

In other words, the cognitive radio technology is the technology that discovers an idle resource (spectrum hole, white space) of spectrum bands allocated to an unlicensed band, and uses the idle resource in an adaptive and opportunistic way, wherein the idle resource is not used in time and space and its availability is low. At this time, if a primary user having the license for the corresponding band is discovered, the cognitive radio system should immediately stop use of the corresponding band or control a transmission power so as not to interrupt the primary user.

However, there have not been suggested detailed technical methods for discovering the idle resource (spectrum hole, white space), of which availability is low or which is not used in time and space, and using the idle resource efficiently without interference with a neighboring homogeneous or heterogeneous system.

DISCLOSURE

Technical Problem

Accordingly, the embodiments suggested in this specification are intended to solve the aforementioned problems. In other words, an object of the present invention according to one embodiment of this specification is to provide a detailed method for discovering an idle resource (spectrum hole, white space) of spectrum bands and using the idle resource efficiently without interference with a neighboring homogeneous or heterogeneous system, wherein the idle resource is not used in time and space and its availability is low.

Technical Solution

According to one disclosure of this specification, there is provided a method for determining a frequency band in a wireless access device, which provides an access point to enable one or more user equipments to wirelessly access a network. The frequency band determination method comprises the steps of receiving database related information from a plurality of servers which have databases related to idle frequency bands of a television broadcasting band; determining a database server to be accessed among the plurality of database servers on the basis of the first information; requesting the determined database server to receive information on one or more available frequency bands; and determining one or more frequency bands, among the received one or more operating frequency bands, for the one or more user equipment. The one or more available frequency bands may be determined by the database server so that the wireless access device can coexist with a neighboring homogeneous or heterogeneous wireless access device without mutual interference within the television broadcasting band.

The database related information may include one or more of index of the database, billing information, and geo-location resolution information.

The step of requesting the determined database server may include transmitting one or more of the geo-location information of the access device and information on the radio access technology.

The frequency band determination method may further comprise the step of transmitting information on the radio access device from the radio access device to the plurality of database servers. The received database information may be generated respectively from the plurality of database servers on the basis of the transmitted information.

The frequency band determination method may further comprise the steps of transmitting a control signal, which includes the database related information, to the one or more user equipments, and receiving a request message from the one or more user equipments. The determined database server may be determined on the basis of the received request message.

The control signal may be a beacon message.

According to one disclosure of this specification, there is provided a radio access device configured to provide an access point to enable one or more user equipments to wirelessly access a network. The radio access device comprises a transceiver; and a controller configured to control the transceiver.

The controller may perform the steps of receiving database-related information from a plurality of servers which have databases related to idle frequency bands of a television broadcasting band, determining a database server to be accessed among the plurality of database servers on the basis of the first information, requesting the determined database server to receive information on one or more available frequency bands, and determining one or more frequency bands, among the received one or more available frequency bands, for the one or more user equipment. The one or more available frequency bands being determined by the database server so that the wireless access device can coexist with a neighboring homogeneous or heterogeneous wireless access device without mutual interference within the television broadcasting band.

Advantageous Effects

According to one embodiment disclosed in this specification as described above, one of a plurality of servers having a database related to an idle spectrum band of TV broadcast bands may be determined to coexist with a neighboring homogeneous or heterogeneous wireless access device at the TV broadcast band without mutual interference.

BEST MODE FOR CARRYING OUT THE INVENTION

Figure 1:
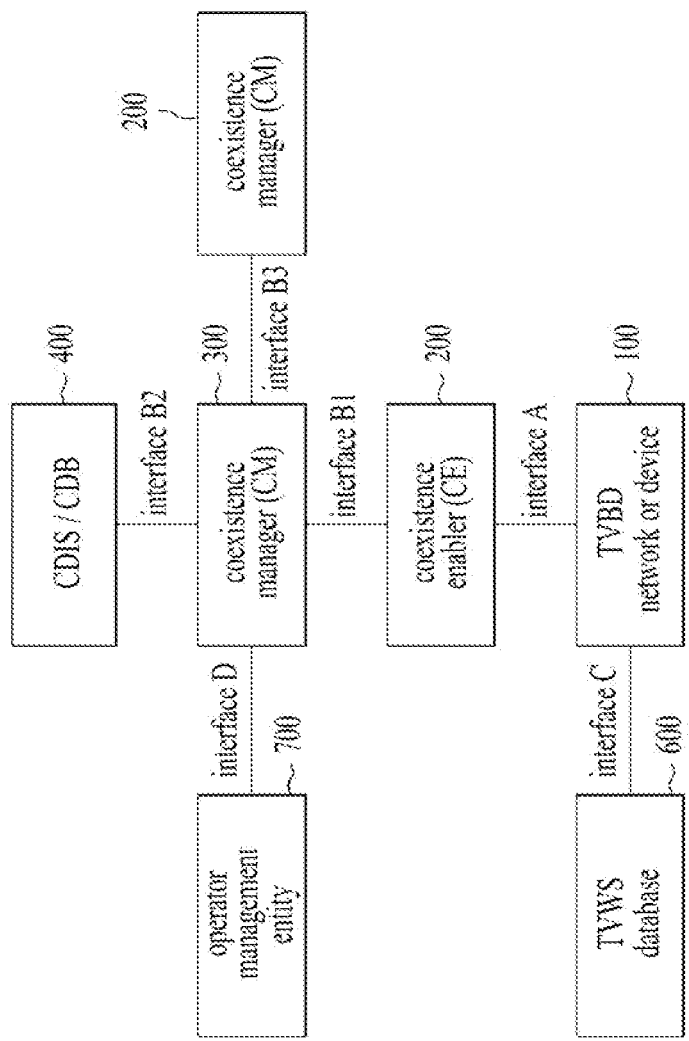
FIG. 1 is a block diagram illustrating a coexistence system according to one embodiment disclosed in this specification.

Since various modifications may be made in the embodiments according to the present invention, specific embodiments will be illustrated in the drawings and will be described in detail in this specification. However, it is to be understood that the embodiments according to the present invention are not limited to a specific disclosure and include all modifications, equivalents or replacements included in technical spirits and technical scope of the present invention.

Although the terms indicating the ordinal number such as first and second may be used to describe various elements, the elements should not be restricted by the terms. The terms are used to identify one element from another element. For example, the first element may be referred to as the second element and vice versa within the scope of the present invention. The terms "and/or" includes combination of a plurality of listed items or any one of the plurality of listed items.

The expression "an element is connected with another element" means that an element may directly be connected with another element or still another element may exist therebetween. On the other hand, the expression "an element is directly connected with another element" means that no still another element exists therebetween.

The terms used in this specification are used to describe a specific embodiment and are not intended to limit the present invention. The singular expression used in this specification includes the plural expression unless meant differently on the context. In this application, it is to be understood that the terms such as "include" and "has" are intended to designate that a feature, number, step, operation, element, part, or their combination, which is disclosed in the specification, exists, and to include that one or more other features, numbers, steps, operations, elements, parts, or their combinations exist or may be provided additionally.

All the terms used in this specification including technical and scientific terms mean the same thing as that is generally understood by the person with ordinary skill in the art to which the present invention pertains, unless defined otherwise. It is to be understood that the terms defined in a dictionary which is generally used mean the same thing as that on the context of the related art, and should not be defined as being ideal or excessively formal, unless defined obviously in this specification.

Hereinafter, reference will now be made in detail to the preferred embodiments of the present invention, examples of which are illustrated in the accompanying drawings. Wherever possible, the same reference numbers will be used throughout the drawings to refer to the same or like parts.

FIG. 1

FIG. 1 is a block diagram illustrating a coexistence system according to one embodiment disclosed in this specification.

As shown in FIG. 1, the coexistence system, 802.19 system has a structure of three logic entities and six logic interfaces.

The three logic entities are defined as a coexistence manager (CM) 200, a coexistence enabler (CE) 300, and a coexistence database (CD) or coexistence discovery and information server (CDIS) 100 in accordance with functions, and the six logic interfaces are defined as an interface A, an interface B1, an interface B2, an interface B3, an interface C, and an interface D in accordance with interfacing with another logic interface of 802.19.1.

In addition, the 802.19 system is mutually connected with external elements such as a TV white space (TVWS) database 200, a television band device (TVBD) network or device 100, and an operator management entity (OME) 300.

In this case, the TV white space means an empty spectrum band that is not used by a broadcast provider at a VHF spectrum band and a UHF spectrum band, which are distributed for TV broadcasting, and also means an unlicensed band that may be used by everyone if a condition for radio wave regulation of the government is satisfied. In more detail, the TV white space spatially means a band which is empty considering spectrum interference between broadcast providers, a spectrum band which is not used per zone, or a zone by which a radio wave for broadcasting is not affected. The TV white space temporally means a broadcasting spectrum which is empty at a time zone that a broadcast provider does not transmit broadcasting at dawn.

The TV white space device should not interrupt reception of a broadcast signal of a TV viewer who is a customer of a broadcast provider, due to interference. Also, the TV white space device should not affect a radio mike device that performs communication at a low power by using a part of the TV white space. To satisfy these conditions, the TV white space device needs some technology as follows.

The spectrum sensing technology that protects a broadcast channel by recognizing a TV channel currently in service, the database and access protocol technology having location based TV channel information, the coexistence technology between heterogeneous devices that use a TVWS band, the intelligent radio access element technology for a variable radio channel, and the security technology for subscriber authentication for radio channel protection and for DB and user protection may be required for the TV white space device. In the present invention, the coexistence technology between homogeneous or heterogeneous devices (or equipments) of the aforementioned technologies will be described.

The CE 300 may request the TVBD network or device 100 of information required for coexistence and acquired the information from the TVBD network or device 100. The CE 300 may switch requests/commands for structure change and control information, which are received from the CM 200, to TVBD specific structure change requests/commands and transmit the switched requests/commands to the TVBD network or device 100. In this case, the TVBD network or device 100 means a user equipment that enables the US federal communication commission (FCC) to use the TV white space.

In order to solve the problem of coexistence between the TV BD networks, the CM 200 may have a search function for other CMs, a coexistence decision making function for generating and providing the coexistence request/command and control information corresponding to the CE 300, and a function (this function may include hierarchical or peer-to-peer pseudo decision in arranging the CM) for supporting exchange of information required for coexistence between the CMs.

Also, the CM 200 may have a function of selecting a representative CM by sharing information among several CMs, a function of generating a coexistence whitespace map having a distributed topology to efficiently share spectrum resources among the other networks and the systems, and a function of adjusting the networks in performing management related to TVWS coexistence.

The CM 200 may be implemented in a device such as an access point (AP) in an embedded type or may be implemented outside the device. The fixed device such as the AP may have the functions of the CM 200, and may select and manage a representative CM of a set of spatially divided equipments, a specific system, or a provider.

At this time, the representative CM may be designated by the CD or CDIS 100 to enable spatial reuse between spatially divided users. At this time, an interference map between the CMs, which is required for resource allocation, may be acquired by geo-location information, or may be acquired by additionally using and processing neighbor information acquired from the CMs. In case of homogeneous networks, the representative CMs may be selected through mutual communication. In case of heterogeneous networks, the representative CMs may be selected through negotiation through a CDB or CDIS 400.

The CM 200 may have a hierarchal CM structure in accordance with coverage or specific classification standard. The CM of the highest layer may select a resource from a whitespace map (WM) acquired from the CDB or CDIS 400 considering its lower layer and the CM of the lowest layer may select a resource from the remaining resources considering its lower layer. This procedure may be repeated.

In case of a small scaled network with small coverage/power, the probability that a primary user may be detected is relatively low and thus more available TVWS channels exist. Accordingly, the small scaled network compares a whitespace map (WM) of a neighboring heterogeneous network with its whitespace map (WM) and first selects and uses a channel that cannot be used by the neighboring heterogeneous network. This may be tuned by the CDIS 11, the CDB 12, or the CD 100 but may be performed distributively in a reverse order from the small scaled network.

The CDB 400 may be referred to as CDIS or CDB in accordance with a function. The CDB or CDIS 400 may have a function of selecting a coexistence whitespace map having a centralized topology to efficiently share a spectrum resource among the other networks and the systems, a function of controlling a plurality of operators in performing management related to TVWS coexistence, and a function of selecting the representative CM to reduce communication overhead between the CMs and solve the problem of coexistence.

Also, the CDB 400 may perform a function of calculating coexistence contour to search for neighboring networks/systems, a function of redirection of C-MAP to be suitable for TVDB to solve the problem of coexistence, a function of supporting search of CMS by expediting open of an interface between the CMs, and a function of collecting, combining and providing information that may expedite coexistence.

The CD 100 may share resources omnipotently in resource allocation or provide the standard of priority of the CMs as an intermediary and perform tuning of resource selection of each CM, or may act as an information sharing medium between external and heterogeneous networks between the CMs as a database DB.

The interface may be divided into three groups as shown in FIG. 1. The interface may be divided into interface B1, interface B2 and interface B3 which are the interfaces between the 802.19.1 entities, interface A which is the interface between the 802.19.1 entity and the TVBD network/device, and interface C and interface D which are the interfaces between the 802.19.1 entity and the TVWS database or OME. Different interfaces of each group may be identified by their usage, a type of exchanged information, and underlying protocols.

The interface A is the interface between the CE 300 and the TVBD network or device 100. Different kinds of information may be provided from the TVBD network or device 100 to the interface A in accordance with information required for coexistence, configuration/information request for coexistence, configuration/measurement/information response and need for coexistence. Different kinds of information may be provided from the CE 300 to the TVBD network or device 100 in accordance with reconfiguration request/command and control information (corresponding to the coexistence requests/command and control information received from the CM), requests/commands related to control of a measured value performed by the TVBD network or device 100, and information and need notifying available resources.

The interface B1 is the interface between the CE 300 and the CM 200. Different kinds of information may be provided from the CE 300 to the CM 200 in accordance with information (information acquired from the TVBD network or device 100) required for coexistence and other information based on the need. Different kinds of information may be provided from the CM 200 to the CE 300 in accordance with coexistence requests/commands and control information and the need.

The interface B2 is the interface between the CM 200 and the CD (or CDIS) 100. Information required for the coexistence map, information required for neighbor set, information required for register/unenrolled, information required for search (acquired by currently used CM), information (acquired by currently used CM) required for coexistence, and information based on the need may be provided from the CM 200 to the CD (or CDIS) 100.

Information notified for the coexistence map, information notified for neighbor set, information notified for the representative CM, information required for search (acquired by other CM), information (acquired by other CM) required for coexistence, and other information may be provided from the CD (or CDIS) 100 to the CM 200.

The interface B3 is the interface between the CM 200 and the CM 21. Information required for search and coexistence, information notified for message, register/unregister (from CM to representative CM or from CM of device to CM of server), information (from CM to representative CM or from CM of server to CM of device), and other information may be provided from the CM 200 to the CM 21.

The interface C is the interface between the TVBD device 100 and the TVWS database 200. Information notified for available channel may be provided from the TVWS database server 600 to the TVBD device 100.

The interface D is the interface between the CM 200 and the OME (operator management entity) 300. Network action information (for example, limited factor related to management of spectrum policy/network) may be provided from the OME 300 to the CM 200, and other information may be provided if necessary.

The coexistence system may have various topologies that may be divided into centralized topology, distributed topology, and intelligent topology. In the present invention, the coexistence system having the centralized topology and the distributed topology will be described mainly.

FIG. 2

Figure 2:
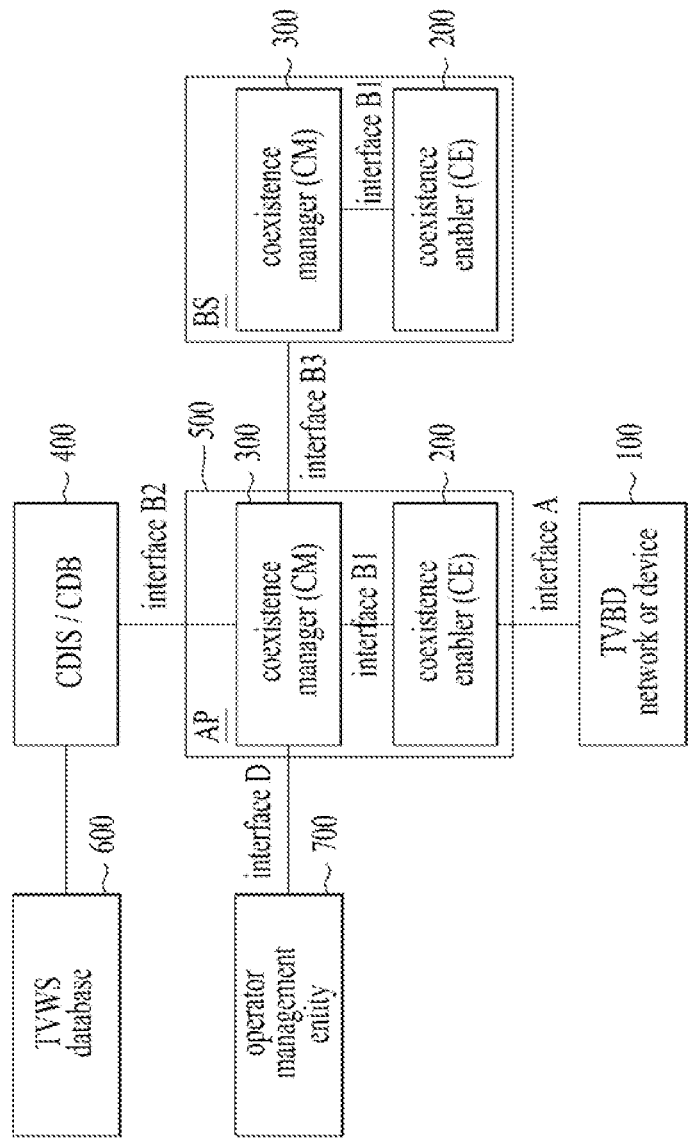
FIG. 2 is a block diagram illustrating a coexistence system according to another embodiment disclosed in this specification.

FIG. 2 is a block diagram illustrating a coexistence system according to another embodiment disclosed in this specification.

As will be aware of it with reference to FIG. 2, the coexistence enabler 200 and the coexistence manager (CM) 300 may be embedded into the access point AP and the base station BS, respectively.

Also, the CDIS/CDB 400 may be connected with the TVWS database server 600. Through this connection, the CDIS/CDB 400 may receive TV white space information from the TVWS database server 600.

FIG. 3

Figure 3:
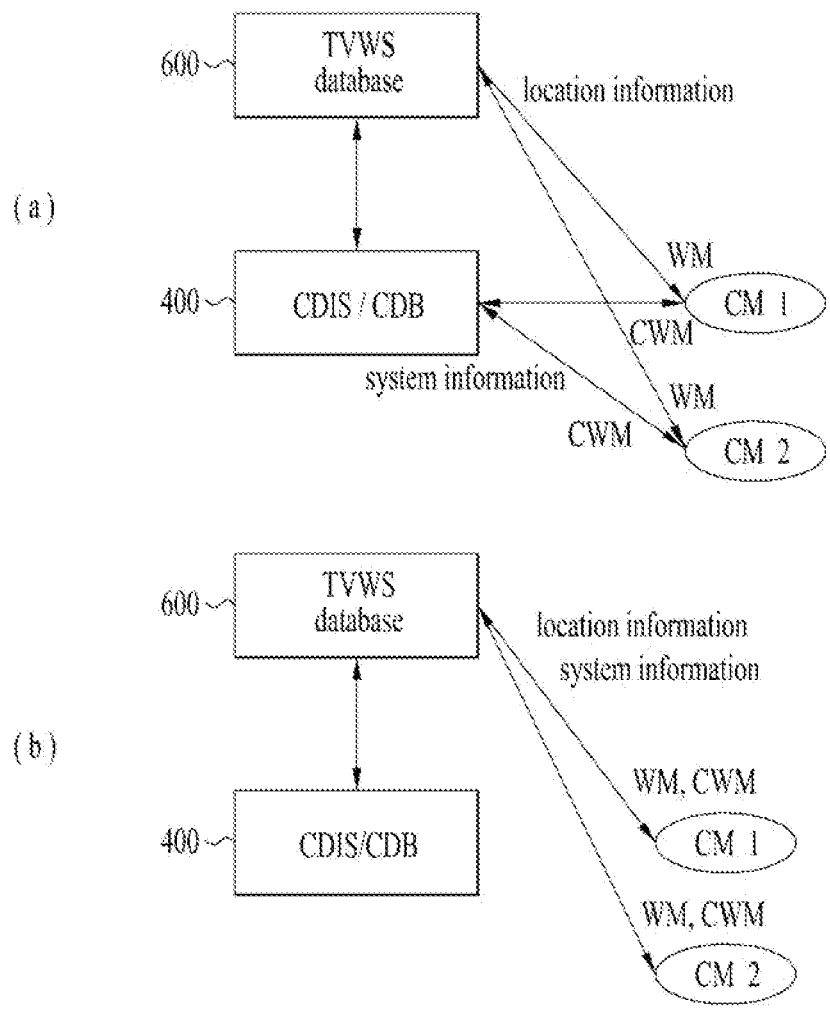
FIG. 3 is an exemplary diagram illustrating an operation of CDIS/CDB 400 shown in FIGS. 1 and 2.

FIG. 3 is an exemplary diagram illustrating an operation of CDIS/CDB 400 shown in FIGS. 1 and 2.

As will be aware of it with reference to FIG. 3, the first coexistence manager CM1 and the second coexistence manager CM2 exist, and are respectively connected with the TVWS database server 600 and the CDIS/CDB 400. The first coexistence CM1 and the second coexistence CM2 receive location information, spectrum information for the broadcasting, for example, information on the whitespace map (WM), from the TVWS database server 600. The whitespace map may mean information of an empty spectrum band which is not used by a broadcast provider at a VHF band and a UHF band, which are distributed for TV broadcasting.

In the meantime, the CDIS/CDB 400 may be connected with the TVWS database server 600, and may receive the spectrum information for the broadcasting, for example, the information on the whitespace map (WM), from the TVWS database server 600. The CDIS/CDB 400 may generate the coexistence whitespace map (CWM) or the coexistence map on the basis of the spectrum information for the broadcasting, for example, the information on the whitespace map (WM), as described above. The CDIS/CDB 400 may forward the generated coexistence whitespace map (CWM) or the coexistence map to the first coexistence manager CM1 and the second coexistence manager CM2.

In the meantime, as will be aware of it with reference to FIG. 3(b), the first coexistence manager CM1 and the second coexistence CM2 are connected with the TVWS database server 600. The TVWS database server 600 may be connected with the CDIS/CDB 400.

The CDIS/CDB 400 may forward the coexistence whitespace map (CWM) or the coexistence map to the TVWS database server 600, and the TVWS database server 600 may forward the received coexistence whitespace map (CWM) or the coexistence map to the first coexistence manager CM1 and the second coexistence manager CM2.

In this case, the TVWS database server 600 may assume the received coexistence whitespace map (CWM) or coexistence map as the spectrum information for the broadcasting, for example, the whitespace map (WM).

Alternatively, the TVWS database server 600 may forward the spectrum information for the broadcasting, for example, the whitespace map (WM), as well as the received coexistence whitespace map (CWM) or coexistence map, to the first coexistence manager CM1 and the second coexistence manager CM2. In this case, the first coexistence manager CM1 and the second coexistence manager CM2 may properly select and use the spectrum information for the broadcasting, for example, the whitespace map (WM), as well as the received coexistence whitespace map (CWM) or coexistence map.

Figure 4:
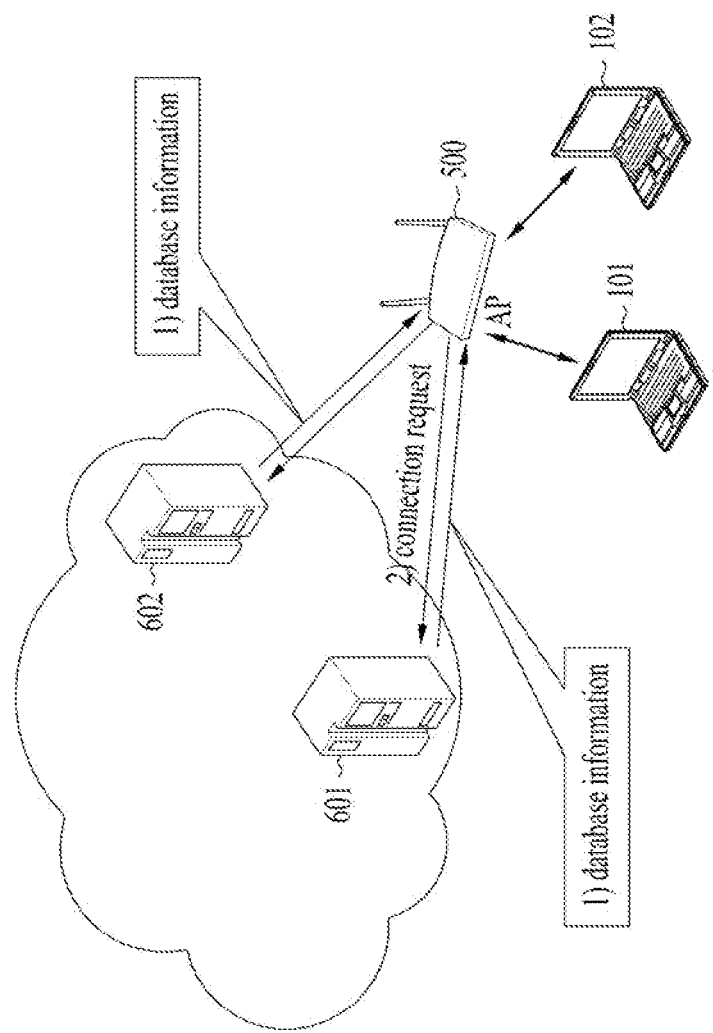
FIG. 4 is an exemplary diagram illustrating a method for selecting a proper database in accordance with the first embodiment if two or more database servers 600 exist.
Figure 5:
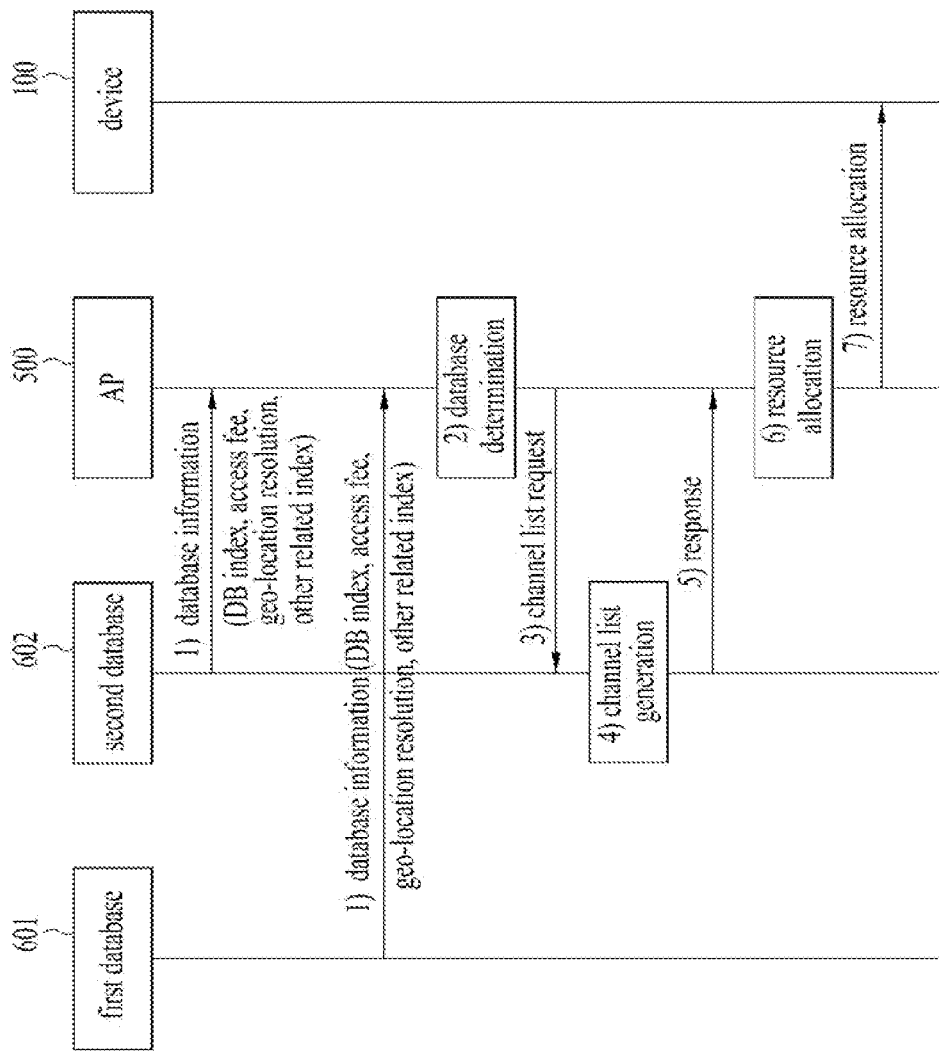
FIG. 5 is a detailed signal flow chart illustrating an example shown in FIG. 4.

FIGS. 4 and 5

FIG. 4 is an exemplary diagram illustrating a method for selecting a proper database in accordance with the first embodiment if two or more database servers 600 exist, and FIG. 5 is a detailed signal flow chart illustrating an example shown in FIG. 4.

As will be aware of it with reference to FIG. 4, if two or more TVWS database servers exist, according to the first embodiment, the first and second TVWS database servers 601 and 602 transmit their own information to the AP 500, and the AP 500 selects one of the first and second TVWS database servers on the basis of the information and requests connection.

In more detail, as will be aware of it with reference to FIG. 5, the first and second database servers 601 and 602 respectively transmit database information. The database information may include one or more of DB index, access fee, geo-location resolution, and other related index.

If the AP 500 receives the information, the AP 500 selects one of the first and second TVWS database servers 601 and 602 on the basis of the information. In more detail, the AP 500 may select one of the first and second TVWS database servers 601 and 602 on the basis of its current location information and the geo-location resolution. Also, the AP 500 may select one of the first and second TVWS database servers 601 and 602 in accordance with access fee of the information on the basis of the user's setting.

FIGS. 4 and 5 exemplarily illustrate that the second database server 602 is selected. The AP 500 transmits a channel list request to the selected second database server 602. At this time, the channel list request may include one or more of the geo-location information of the AP 500 and information on the radio access technology.

The second database server 602 identifies a neighboring AP or BS of the AP 500 on the basis of one of the geo-location information of the AP 500 and the information on the radio access technology. Also, the second database server 602 calculates the coexistence contour with the neighboring AP or BS of the AP 500. The second database server 602 generates a coexistence whitespace map (CWM) or coexistence map for the AP 500 from spectrum information for broadcasting, for example, information (information on an empty spectrum band, which is not used by a broadcast provider, at VHF and UHF spectrum bands distributed for TV broadcasting) on the whitespace map (WM), and transmits a response message, which includes the generated coexistence whitespace map CWM or coexistence map, to the AP 500. At this time, the coexistence whitespace map (CWM) or coexistence map for the AP 500 may be included in the response message by being assumed as the whitespace map (WM). In this case, the AP 500 may recognize the coexistence whitespace map (CWM) or coexistence map within the response message as the whitespace map.

The AP 500 may determine its management channel on the basis of the whitespace map and allocate resources to devices accessed thereto.

Figure 6:
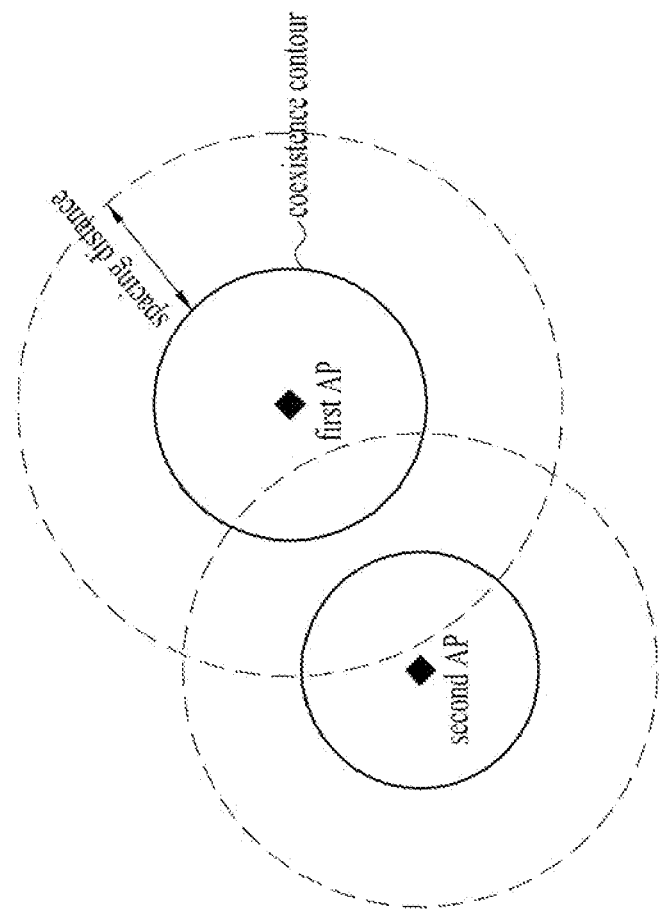
FIG. 6 is an exemplary diagram illustrating the coexistence contour.
Figure 7:
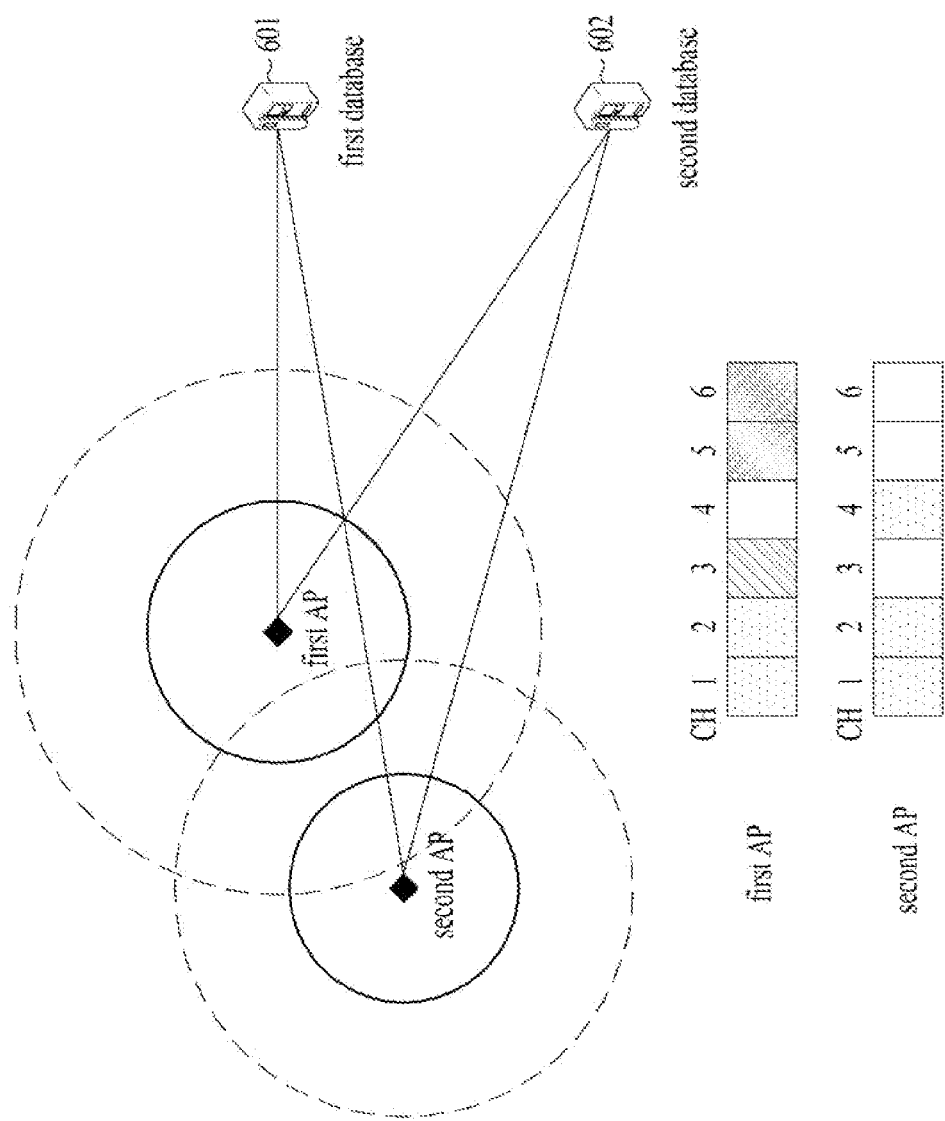
FIG. 7 is a diagram illustrating an example of a coexistence whitespace map (CWM) or coexistence map, which is transmitted from a first database or a second database 501 or 502 under an environment of FIG. 6.

FIGS. 6 and 7

FIG. 6 is an exemplary diagram illustrating the coexistence contour.

As will be aware of it with reference to FIG. 6, the first AP and the second AP exist to adjoin each other. The coexistence contour of each AP is shown with a solid line, and the distance between the first AP and the second AP is shown with a dotted line. The coexistence contour is determined by features of the respective APs. As will be aware of it with reference to FIG. 6, the coexistence contours of first AP and the second AP almost adjoin each other.

FIG. 7 is a diagram illustrating an example of a coexistence whitespace map (CWM) or coexistence map, which is transmitted from a first database or a second database 501 or 502 under an environment of FIG. 6.

As shown at a right top of FIG. 7, it is assumed that channels from 1 to 6 exist. At this time, it is assumed that the channel 1 and the channel 2 are the channels, which are being used for broadcasting, in accordance with the spectrum information for broadcasting, for example, the whitespace map.

As shown, the first database or the second database 601 or 602 transmits the coexistence whitespace map (CWM) or coexistence map indicating that the channel 4 is an idle channel to the first AP. Also, the first database or the second database 601 or 602 transmits the coexistence whitespace map (CWM) or coexistence map indicating that the channels 3, 5 and 6 are idle channels to the second AP.

As described above, the first database or the second database 601 or 602 may transmit the coexistence whitespace map (CWM) or coexistence map to the first AP and the second AP, respectively, whereby the first AP and the second AP may coexist on the radio.

Figure 8:
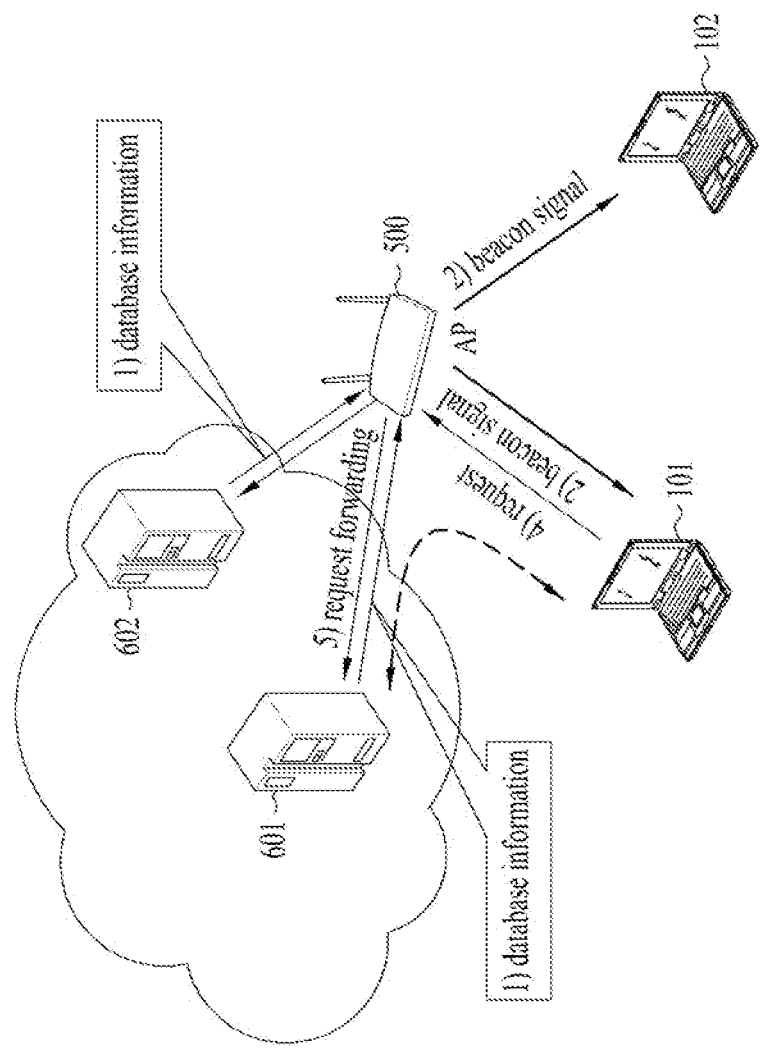
FIG. 8 is an exemplary diagram illustrating a method for selecting a proper database in accordance with the second embodiment if two or more database servers 600 exist.
Figure 9:
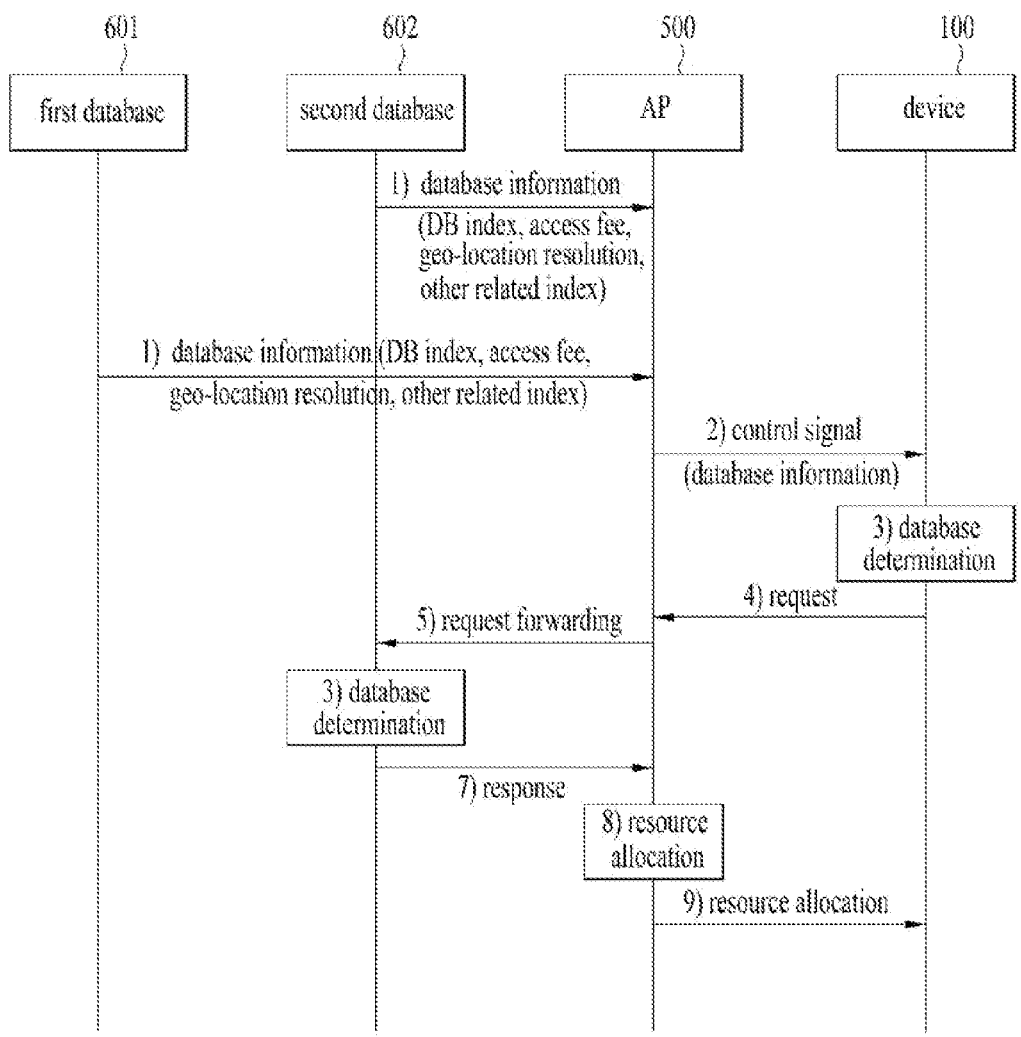
FIG. 9 is a detailed signal flow chart illustrating an example shown in FIG. 8.

FIGS. 8 and 9

FIG. 8 is an exemplary diagram illustrating a method for selecting a proper database in accordance with the second embodiment if two or more database servers 600 exist, and FIG. 9 is a detailed signal flow chart illustrating an example shown in FIG. 8.

As will be aware of it with reference to FIG. 8, if two or more TVWS database servers exist, according to the second embodiment, the first and second TVWS database servers 601 and 602 transmit their own information to the AP 500, and the AP 500 forwards the information to the devices 101 and 102 connected thereto. Each of the devices 101 and 102 selects one of the first and second TVWS database servers 601 and 602 on the basis of the information and requests connection.

In more detail, as will be aware of it with reference to FIG. 9, the first and second database servers 601 and 602 respectively transmit database information to the AP 500. The database information may include one or more of DB index, access fee, geo-location resolution, and other related index.

The AP 500 may transmit the database information to the device 101 or 102 (hereinafter, referred to as 100) accessed thereto by including the database information in a control signal. The control signal may be a beacon message if the AP 500 is based on the IEEE 802.11 or IEEE 802.16. The control signal may further include the geo-location information of the AP.

If the device 100 receives the control signal, the device 100 extracts the database information within the control signal and selects one of the first and second TVWS database servers 601 and 602 on the basis of the extracted information. In more detail, the device 100 may select one of the first and second TVWS database servers 601 and 602 on the basis of its current location information or geo-location information of the AP and the geo-location resolution.

FIGS. 8 and 9 exemplarily illustrate that the second database server 602 is selected. The device 100 transmits a request for the selected second database server 602 to the AP.

Then, the AP transmits a channel list request to the selected second database server 602.

Then, the second database server 602 identifies a neighboring AP or BS of the AP 500 on the basis of one or more of the geo-location information of the AP 500 or the device and the information on the radio access technology.

Also, the second database server 602 calculates the coexistence contour with the neighboring AP or BS of the AP 500. The second database server 602 generates a coexistence whitespace map (CWM) or coexistence map for the AP 500, and transmits a response message, which includes the generated coexistence whitespace map CWM or coexistence map, to the AP 500. At this time, the coexistence whitespace map (CWM) or coexistence map for the AP 500 may be included in the response message by being assumed as the whitespace map (WM). In this case, the AP 500 may recognize the coexistence whitespace map (CWM) or coexistence map within the response message as the whitespace map.

The AP 500 may determine its management channel on the basis of the whitespace map and allocate resources to devices accessed thereto.

Figure 10:
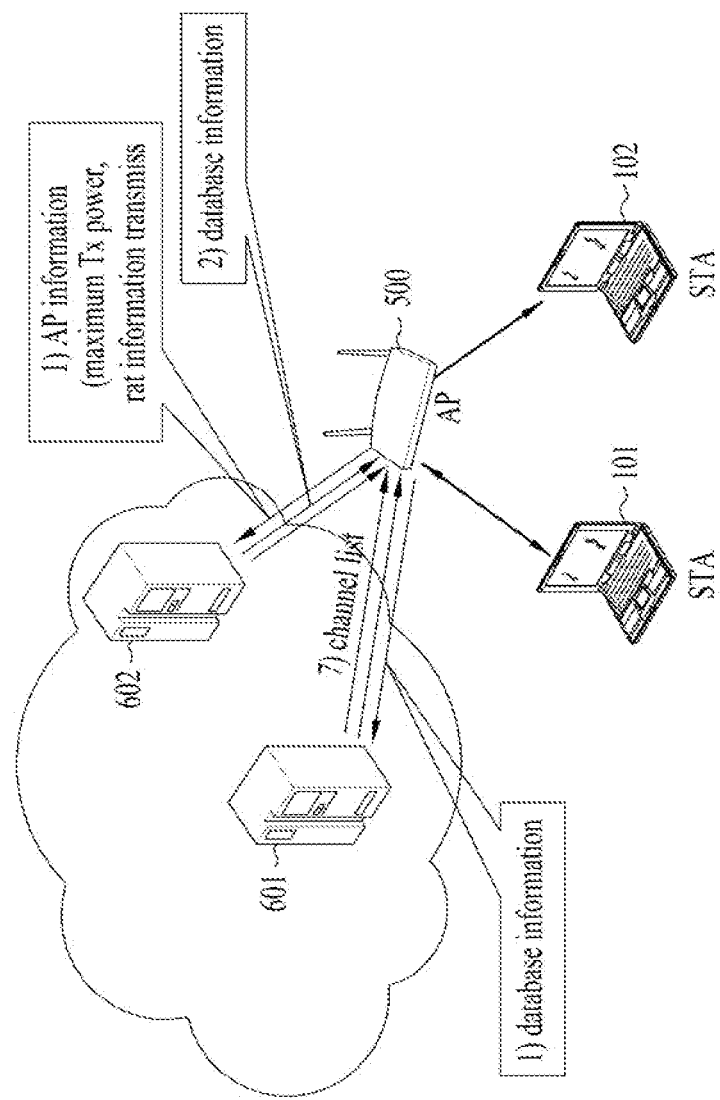
FIG. 10 is an exemplary diagram illustrating a method for selecting a proper database in accordance with the third embodiment if two or more database servers 600 exist.
Figure 11:
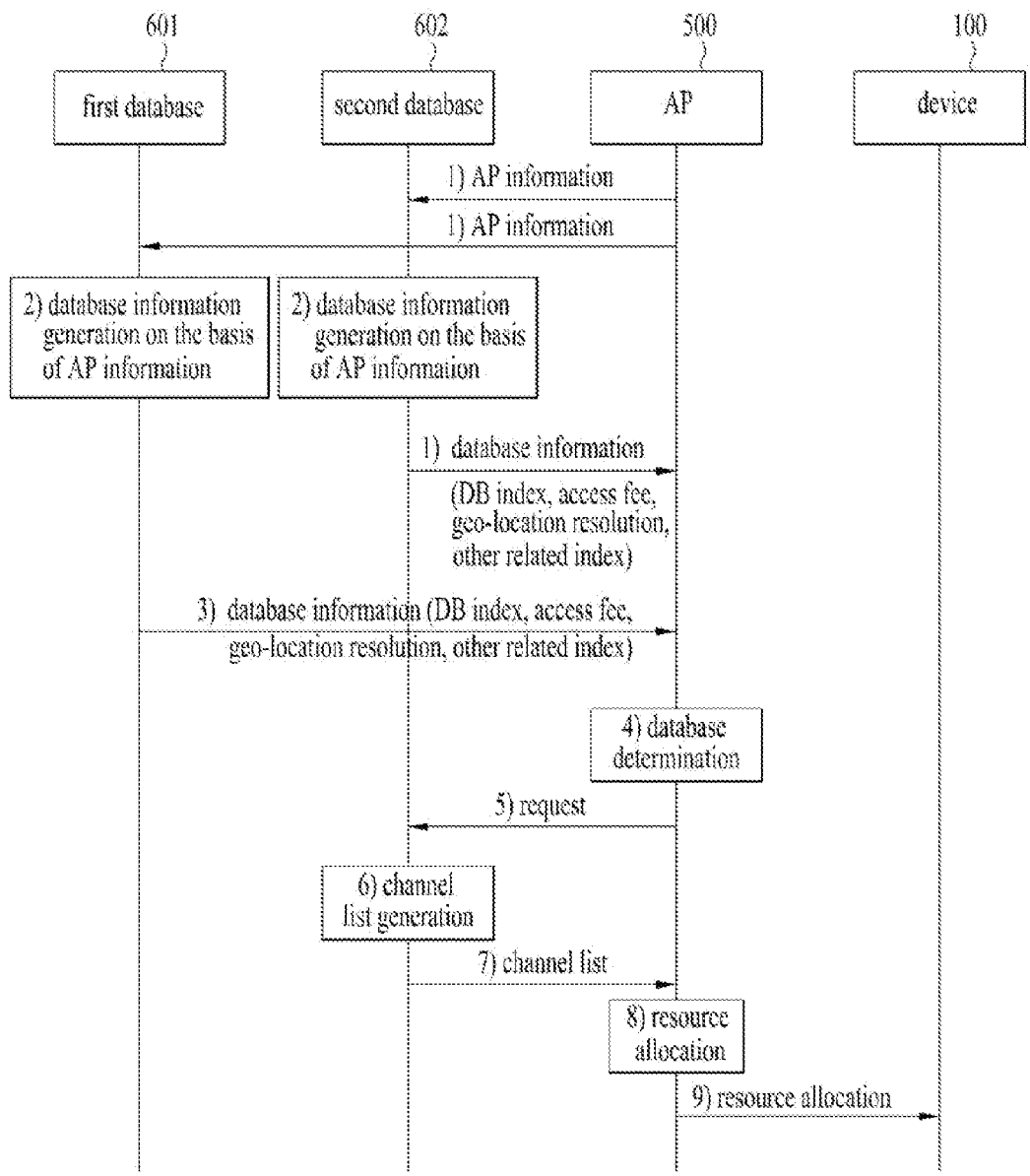
FIG. 11 is a detailed signal flow chart illustrating an example shown in FIG. 10.

FIGS. 10 and 11

FIG. 10 is an exemplary diagram illustrating a method for selecting a proper database in accordance with the third embodiment if two or more database servers 600 exist, and FIG. 11 is a detailed signal flow chart illustrating an example shown in FIG. 10.

As will be aware of it with reference to FIG. 10, if two or more TVWS database servers exist, according to the third embodiment, the AP 500 transmits its own information to the first and second TVWS database servers 601 and 602, and the first and second TVWS database servers 601 and 602 generate information their databases on the basis of the information of the AP 500 and transmits the generated information to the AP 500. Then, the AP 500 selects one of the first and second TVWS database servers 601 and 602 on the basis of its information and requests connection.

In more detail, as will be aware of it with reference to FIG. 11, the AP transmits its information, for example, maximum Tx power, RAT information, etc.

Then, the first and second database servers 601 and 602 generate their database information on the basis of the information of the AP 500.

The first and second database servers 601 and 602 respectively transmit their database information to the AP 500. The database information may include one or more of DB index, access fee, geo-location resolution, and other related index.

If the AP 500 receives the information, the AP 500 selects one of the first and second TVWS database servers 601 and 602 on the basis of the information. In more detail, the AP 500 may select one of the first and second TVWS database servers 601 and 602 on the basis of its current location information and the geo-location resolution. Also, the AP 500 may select one of the first and second TVWS database servers 601 and 602 in accordance with access fee of the information on the basis of the user's setting.

FIGS. 10 and 11 exemplarily illustrate that the second database server 602 is selected. In addition, since the description illustrated in FIGS. 10 and 11 is similar to that illustrated in FIG. 4 to FIG. 9, their detailed description will be omitted.

FIG. 12

Figure 12:
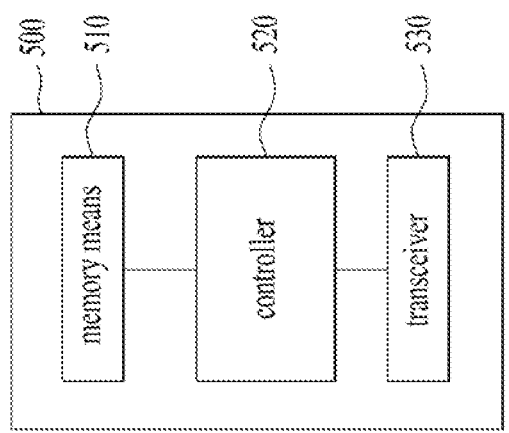
FIG. 12 is a block diagram illustrating an access point (AP) 500 disclosed in this specification.

FIG. 12 is a block diagram illustrating an access point (AP) 500 disclosed in this specification.

As shown in FIG. 12, the AP 500 includes a memory means 510, a controller 520, and a transceiver 530.

The memory means 510 stores the methods according to the embodiments shown in FIG. 1 to FIG. 11.

The controller 520 controls the memory means 510 and the transceiver 530. In more detail, the controller 520 implements the methods stored in the memory means 510. The controller 520 transmits the aforementioned signals through the transceiver 530.

In this case, the terms used in this specification and claims should not be understood as conventional or dictionary definition and should be defined as meaning matched with technical spirits disclosed in this specification.

Accordingly, since the embodiments disclosed in this specification and drawings are only exemplary and do not cover all the technical spirits disclosed in this specification, it is to be understood that various modifications, equivalents or replacements may be made in the embodiments disclosed in this specification at the time when this application is filed.

The invention claimed is:

1. A frequency band determination method of a wireless access device which provides an access point to enable one or more user equipments to wirelessly access a network, the frequency band determination method comprising the steps of:
   receiving, by the wireless access device, first database-related information from a first database server and second database-related information from a second database server when two or more database servers exist,
   wherein the first database-related information includes one of a first database index, a first database access fee or a first database geo-location resolution, and
   wherein the second database-related information includes one of a second database index, a second database access fee or a second database geo-location resolution;
   transmitting, by the wireless access device, the first and the second database-related information to a user equipment connected to the wireless access device;
   receiving, by the wireless access device, a request message from the user equipment;
   based on the request message, determining, by the wireless access device, a database server to be accessed among the first and second database servers;
   receiving, by the wireless access device from the determined database server, one or more available frequency bands for exchanging information with the determined database server; and
   determining, by the wireless access device, one or more frequency bands, among the received one or more available frequency bands, to exchange data between the determined database server and the user equipment via the wireless access device,
   wherein the one or more available frequency bands are identified by the determined database server so that the wireless access device can coexist within a television broadcasting band with a neighboring homogeneous or heterogeneous wireless access device without mutual interference.

2. The frequency band determination method according to claim 1, wherein the step of requesting the determined database server includes transmitting one or more of geo-location information of the wireless access device and information on a radio access technology of the wireless access device.

3. The frequency band determination method according to claim 1, further comprising:
   transmitting information on the radio access device from the wireless access device to the first and second database servers,
   wherein the received first and second database-related information is generated respectively by the first and second database servers based on the transmitted information.

4. The frequency band determination method according to claim 1, wherein the first and the second database-related information are transmitted via a beacon message.

5. A radio access device configured to provide an access point to enable one or more user equipments to wirelessly access a network, the radio access device comprising:

a transceiver; and
a controller operatively connected to the transceiver and configured to:
receive first database-related information from a first database server and second database-related information from a second database server when two or more database servers exist,
wherein the first database-related information includes one of a first database index, a first database access fee or a first database geo-location resolution, and
wherein the second database-related information includes one of a second database index, a second database access fee or a second database geo-location resolution;
transmit the first and the second database-related information to the user equipment connected to the wireless access device;
receive a request message from the user equipment;
based on the request message, determine a database server to be accessed among the first and second database servers;
receiving, by the wireless access device from the determined database server, one or more available frequency bands for exchanging information with the determined database server; and
determine one or more frequency bands, among the received one or more available frequency bands, to exchange data between the determined database server and the user equipment via the wireless access device,
wherein the one or more available frequency bands are identified by the determined database server so that the wireless access device can coexist within a television broadcasting band with a neighboring homogeneous or heterogeneous wireless access device without mutual interference.

6. The radio access device according to claim 5, wherein the controller transmits one of geo-location information of the wireless access device or information on a radio access technology of the wireless access device when requesting the determined database.

7. The radio access device according to claim 5,
wherein the controller further transmits information on the wireless access device to the first and second database servers, and
wherein the received first and second database-related information is generated respectively by the first and second database servers based on the transmitted information.

8. The radio access device according to claim 5, wherein the first and the second database-related information are transmitted via beacon message.

* * * * *